Aug. 29, 1967  R. J. RUCKRIEGEL ETAL  3,339,044
THERMOSTATIC SWITCH

Filed Jan. 3, 1966  3 Sheets-Sheet 1

Raymond J. Ruckriegel,
Jerry A. Risk,
Inventors.
Koenig, Senniger,
Powers and Leavitt
Attorneys.

Aug. 29, 1967  R. J. RUCKRIEGEL ETAL  3,339,044
THERMOSTATIC SWITCH
Filed Jan. 3, 1966  3 Sheets-Sheet 2

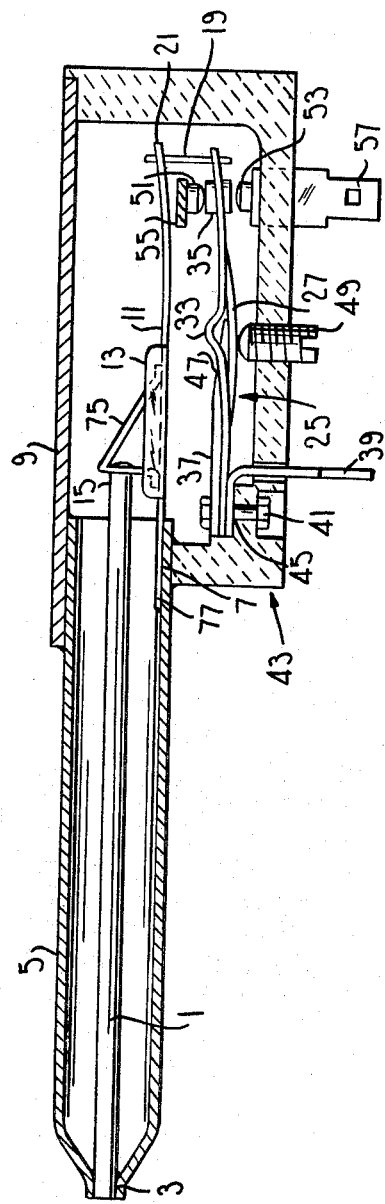

United States Patent Office 3,339,044
Patented Aug. 29, 1967

3,339,044
THERMOSTATIC SWITCH
Raymond J. Ruckriegel, Fern Creek, and Jerry A. Risk, Woodford, Ky., assignors to Texas Instruments Incorporated, Dallas, Tex., a corporation of Delaware
Filed Jan. 3, 1966, Ser. No. 518,127
4 Claims. (Cl. 200—137)

ABSTRACT OF THE DISCLOSURE

Relatively movable elements of a rod-and-tube thermostat are coupled to a cantilever spring at a reinforcement on the latter between its anchored and movable ends. The spring has a positive spring rate when deformed by a force at its free end. There is also provided a cantilever spring blade having anchored and movable ends. The movable end carries an electrical contact for cooperation with a stationary electrical contact. The blade has a spring rate including a range in which the rate is negative. Spaced stop means including the stationary contact are provided to confine the displacement of the movable end of the blade within said negative range to minimize the operating temperature differential. The movable ends of the spring and the blade are connected by a compression member which provides normally balanced reaction forces between said movable ends. Under any imbalance between these forces in one direction or another, one or another of the movable ends of the spring or blade will reversely drive the other. Adjusting means is provided to obtain a balance of forces at a critical temperature of the thermostat. When the thermostat changes temperature in one direction or another, it actuates the cantilever spring to produce a force imbalance in one direction or the other so that the blade is urged to drive its movable contact in one direction under one condition of force imbalance and in the opposite direction under the other condition of force imbalance.

Among the several objects of the invention may be noted the provision of an adjustable thermostatic switch construction combining the advantages of a rod-and-tube thermostat and a pre-stressed blade switch whereby efficient contact snap action is obtained; the provision of a thermostatic switch of the class described which minimizes the danger of contact arcing and welding; and the provision of a thermostatic switch of this class requiring less thermal energy input for a complete cycle of operation, thereby narrowing the operating temperature differential. Other objects and features will be in part apparent and in part pointed out hereinafter.

The invention accordingly comprises the apparatus hereinafter described, the scope of the invention being indicated in the following claims.

In the accompanying drawings, in which several of various possible embodiments of the invention are illustrated:

Figure 4:
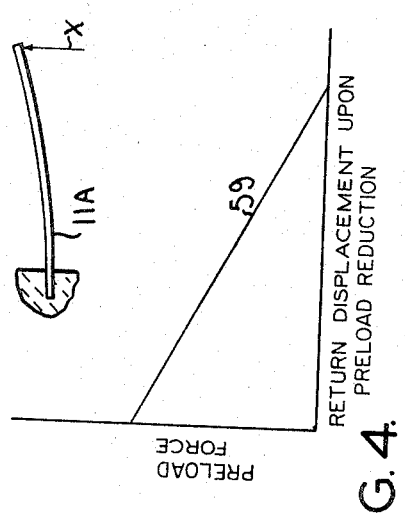

FIG. 4 is a force-displacement diagram of a conventional cantilever spring. An initial upward force X is assumed. As the force X is decreased the resulting force-displacement relationship is shown in the diagram.

Figure 6:
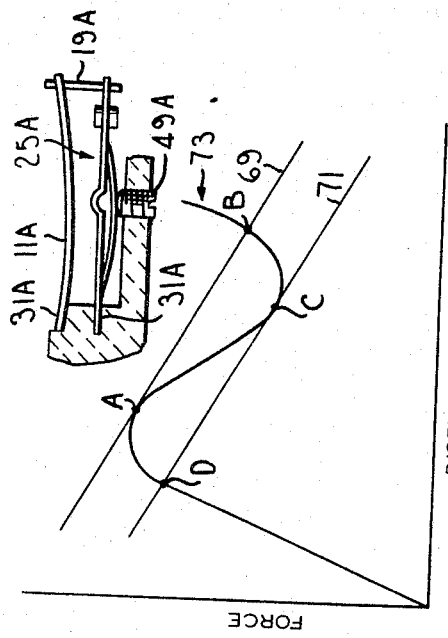
Figure 5:
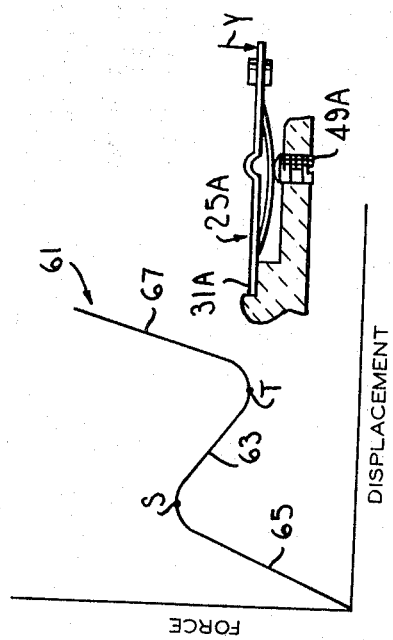

FIG. 5 is a force-displacement diagram of the pre-stressed spring blade, the latter being illustrated diagrammatically in the figure;

FIG. 6 is a force-displacement diagram of a combination of the cantilever spring of FIG. 4 and the pre-stressed spring blade of FIG. 5. The two springs are initially loaded against each other with the snap blade acting as the preload (or force X of FIG. 4).

Figure 1:
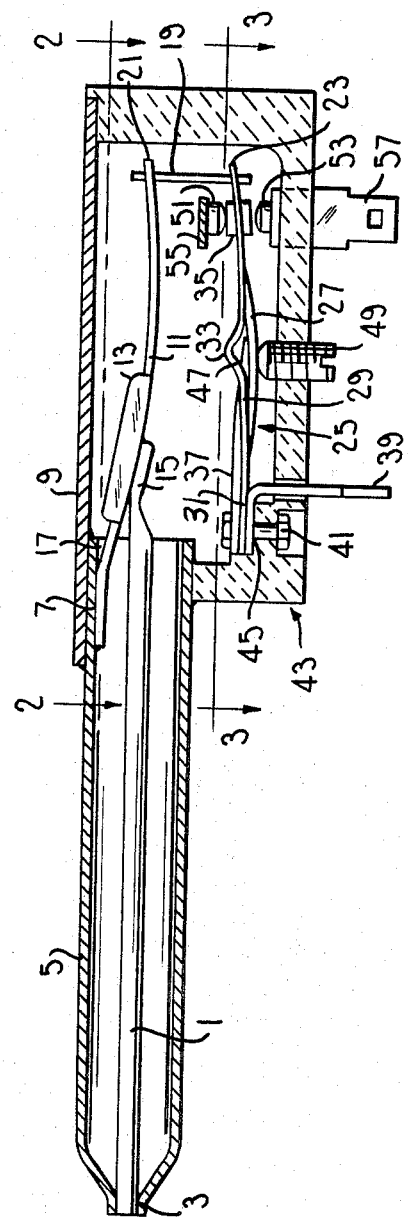
FIG. 1 is a longitudinal section illustrating one form of the invention.
Figure 7:
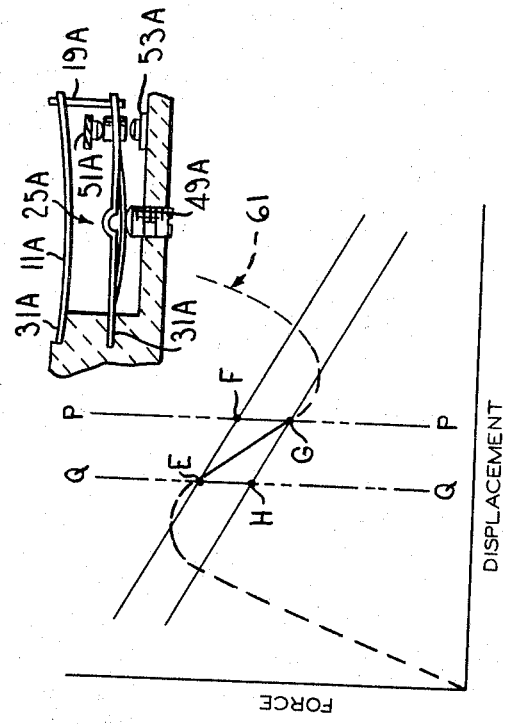

FIG. 7 is a view illustrating the effects upon the force-displacement diagram of FIG. 6 of the addition of limiting stops for restricting the free action of the spring blade and cantilever spring; and FIG. 8 is a view similar to FIG. 1, showing an alternative form of the invention.

Corresponding reference characters indicate corresponding parts throughout the several views of the drawings.

The combination of a so-called rod-and-tube thermostat with a switch, either of the slow acting or snap-acting type, is known (see, for example, U.S. Patent 2,793,270). Show-acting switches will operate at narrow temperature differentials, but are subject to contact arcing and sticking. When such a thermostat is combined in the former manner with a conventional snap-acting switch (such as shown in FIG. 10 of said patent) a comparatively wide temperature differential results. We have found that such a structure can be much improved by employing a pre-stressed spring blade having selected characteristics, and making resilient the drive means therefor from the differentially operating thermostatic rod-and-tube components.

Referring now more particularly to FIG. 1, there is shown at numeral 1 a rod or the like composed of material of comparatively low thermal coefficient of expansion. The rod 1 is permanently attached at 3 as by brazing, welding or the like to one end of a tube 5. Tube 5 is composed of a material which has a comparatively high thermal coefficient of expansion. It operates in compression in the FIG. 1 form.

At 7, near the other open end of the tube 5, is permanently attached a bracket 9 and also one end of a cantilever spring 11, as by brazing, welding or the like in both cases. A limited part of this cantilever spring 11 is stiffened by ears 13 adjacent the point 7.

The unanchored end 15 of the rod 1 is attached to the spring 11 in the stiffened region between ears or ribs 13 by brazing, welding or the like. The assembly thus far described is a thermal actuator in that temperature changes applied to tube 5 and rod 1 will cause unequal expansions of these members. This in turn will cause swinging of the spring 11 around what may be referred to as a hinged connection in the region 17 which is near the anchor point 7. Attached to the outer flexible end of the spring 11 is a link 19 composed of electrically insulating material. This serves to transfer force between the outer end 21 of the spring 11 and the outer end 23 of pre-stressed spring-metal blade 25. The spring-metal blade 25 is shown in side elevation in FIG. 1 and in plan view in FIG. 3. It is mounted as a cantilever, being anchored at one end 31. The blade 25 per se is of a known design, being punched to form a central strip 27 and two spaced sidewise strips 29 joining ends 23 and 31. The sidewise strips 29 are crimped as shown at 33, whereby the central strip 27 becomes bowed as shown. This produces certain variable spring-rate characteristics which will be referred to below. It is to be emphasized here that blades such as 25 have variable spring rates, and may be snap-acting. However, by means of the invention, this particular combination of elements yields snap action of improved characteristics.

A movable dual contact 35 is attached to the blade 25. The blade 25 is anchored at its end 31 between one end of a bias spring 37 and a terminal 39. This is accomplished by means of a rivet 41 which attaches the blade 25 and bias spring 37 to a housing 43 at point 45. The bias spring 37 is arranged so that its other end 47 presses down on the bowed portion 27 of the blade 25 and in doing so pushes it against an adjusting screw 49. Thus the center portion of the blade 25 is always forced against the end of the adjusting screw 49. Stationary contacts 51 and 53 are supported on terminals 55 and 57, which are riveted to the housing 43 in appropriate manner. Contact 51 also serves as a backstop and contact 53 as a forward stop. The housing 43 may be constructed entirely of rigid insulating material as shown, or if not it should be provided with suitable insulating means around such parts connected thereto as should be insulated from one another, as will be obvious to those skilled in the art.

In order that the operation of the device to be set out below may be thoroughly understood, reference is first made to diagrammatic FIGS. 4-7. In FIG. 4, numeral 11A illustrates a common cantilever leaf spring to which loading force may be applied at its end as illustrated at the arrow X. Spring 11A is equivalent to leaf spring 11. Such a spring (11 or its equivalent 11A) has a positive spring rate. Positive spring rate is defined as an increase of deflection upon increase in applied force. The line 59 (FIG. 4) illustrates at its left end a preload force applied as at X to deflect such a spring from an initial unstressed and usually straight configuration. The descending line 59 illustrates how, as the preload force at X is reduced, there will be a return displacement of the spring from its stressed (curved) configuration toward its unstressed (straight) configuration. In FIG. 4 the line 59 descends to the right, indicating a return displacement upon reduction of the preload on a spring such as 11A. Its slope is the same as the slope of a line which would represent the positive spring rate of spring 11A if plotted from left to right, so as to indicate deflection or displacement of the spring from an unstressed to a stressed condition.

FIG. 5 shows a blade 25A (like blade 25) anchored at one end 31A and supported midway by an adjusting screw 49A. This blade may be provided with loading force as illustrated by the arrow Y, resulting in a force-displacement curve as illustrated by line 61 on FIG. 5. This line 61 shows in portion 63 in the range S-T a spring rate (slope) which is negative, i.e., increasing displacement or deflection from an initial condition is brought about by decrease in force. This negative spring rate portion lies between two positive spring rate portions 65 and 67 (slopes) where increasing displacements require increases in force. The portion 63 is directly useful to the invention, but portions 65 and 67 are not directly useful. It is critical that the negative slope or spring rate 63 (FIG. 5) shall be greater, i.e., steeper than the slope or steepness of line 59 (FIG. 4). It should be here noted that curve 61 does not indicate any snap action of the blade 25A per se in the range 63, since to drive it completely through its displacements through the range 63 requires the continued application of force at Y, although this force may be increasing (at 65 and 67) or decreasing (at 63). As will appear below, forces X and Y are reactive, each depending upon the other for its existence.

Referring now to FIG. 6 it again illustrates the spring blade 25A mounted as in FIG. 5. At numeral 11A in FIG. 6 is shown the cantilever spring of FIG. 4. The outer ends of the spring 11A and of the blade 25A are linked as shown at 19A which is a counterpart of link 19 in FIG. 1. Thus the force on the end of cantilever spring 11A is supplied by reaction from the end of the blade 25A when the spring is swung down around its anchored left end. Lines 69 and 71 on FIG. 6 are like line 59 of FIG. 4. The curved line 73 is like line 61 of FIG. 5.

Next assume that the loading force of cantilever spring 11A increases in response to action of some thermostatic apparatus, as is the case with spring 11 of FIG. 1, the latter force being developed by thermostatic action of the rod-and-tube elements 1 and 5 in response to heating. Since the two spring members 11A and 25A (FIG. 6) are opposing each other and are free to move, their forces will normally be balanced under static conditions. However, if the member 11A is loaded to the position as indicated at point A in FIG. 6, any movement will cause the downward force of the spring 11A to be greater than the upward forces at the end of the blade 25A. Thus the spring 11A will begin to move toward the blade 25A. As this movement takes place, equilibrium cannot be immediately reached because the spring rates along AB and AC are diverging. In effect, the spring 11A chases and accelerates the blade 25A whereby efficient snap action of the blade 25A occurs. Equilibrium will again be reached when the forces are in a balance at B and motion will cease.

Next, if the action of spring 11A is reversed (as upon cooling of the tube 5 in FIG. 1) the downward force of spring 11A will first decrease to point C (FIG. 6). Then the upward force of the blade 25A becomes greater than the downward force of the spring 11A. Hence the blade will begin to move toward the spring. As this movement takes place, equilibrium cannot immediately be reached because the spring rates are diverging along CA and CD. In effect, the blade 25A accelerates and chases the spring 11A. Static equilibrium will be reached when the forces are in balance at D and motion will then again cease.

Referring now to illustrative FIG. 7, this is the same as FIG. 6 except that abutments 51A and 53A have been added. These are counterparts of stationary contacts 51 and 53 of FIG. 1. Now the system will snap in one direction from a position corresponding to point E but will be stopped at point G on line PP. Stoppage is effected by stop 53A. The difference F-G in the two forces will be the force against the lower stop 53A. Reversely, the system will snap in the opposite direction from point G but will be stopped at a point E on line QQ. Stoppage is effected by the stop 51A. The force against this upper stop 51A will be equal to the force difference E-H. Thus it will be seen that the contacts or stop means 51 and 53 (FIG. 1) restrict activity to that part of curve 61 of blade 25 shown at 63 between points S and T (FIG. 5). In other words, within the permitted movement, spring 11A operates at all times with a positive spring rate and spring blade 25A at all times operates with a greater but negative spring rate. These properties are of importance to successful operation. Solid line EG on FIG. 6 shows the operating range as limited by the contact stops 51A, 53A. The dotted portions of curve 61 do not come into play.

Returning now to FIG. 1, it can now be seen more clearly how the device shown therein operates. Temperature changes applied to the differential rod-and-tube elements 1 and 5 vary the loading of the resilient cantilever spring 11. Since the spring rate of spring 11 is positive and that of the blade 25 greater but negative, as discussed in connection with FIGS. 4 and 5, the resulting actions of blade 25 operate the movable contact 35 to and from the fixed contacts 51 and 53 with snap action between narrow limits of displacement of spring 11 and hence between narrow temperature differences as applied to the tube 5 and rod 1. The resulting snap action is to be distinguished from the type of action which would be obtained if the spring 11 were simply a stiff member and the blade 25 snap-acting per se. It is because of the accelerating actions above described that the improved snap action under low temperature differential may be obtained.

It will be understood that by adjusting the screw 49 the operating temperature of the device is changed. By lowering the upper stop-forming contact 55, the line Q—Q on FIG. 7 will be shifted to the right. By raising the position of the lower stop-forming contact 53, the line P—P on FIG. 7 will be shifted to the left. Thus it will be seen that the particular positions chosen for the contacts 53 and 55 determine the displacement differential.

By having a positively operable connection such as 19 between cantilever spring 11 and the blade 25, the input force supplied by the differential expansion of rod 1 and tube 5 is transmitted perpendicularly to the contacts so that in the unlikely event that contact sticking or welding should occur, the continued heating or cooling of the thermal elements 1 and 5 will provide a direct breaking force. Another advantage is that less thermal energy input is required for effecting a complete cycle of operation. This is of importance inasmuch as it is tantamount to requiring only a small temperature change in order to bring about snap action.

It is to be understood that the rod 1 may be connected to the upper side of the cantilever spring 11 rather than to its lower side. It will then operate in compression. Such a connection is illustrated at 75 on FIG. 8 in which like numerals designate like parts. In this case the pivotal attachment between spring 11 and tube 5 is located at 77. In this modification, expansion of the tube 5 will cause lifting, rather than depression of the spring 11. In other words, in the FIG. 8 form cooling accomplishes what heating accomplished in the FIG. 1 form, and vice versa.

It will also be understood that although the link 19 is shown in all figures as being rigid and loadable in compression, it might be a tension member if the blade 25 were to be located in an inverted position along with its adjusting screw and holder 37.

Figure 3:
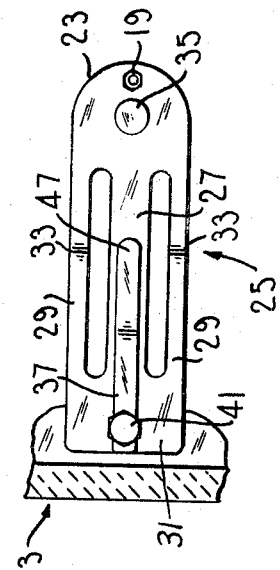
FIG. 3 is a plan view of a pre-stressed spring blade component and a hold-down member therefor, being viewed on line 3—3 of FIG. 1.

In the following claims, the term pre-stressed spring blade means a blade 25 such as shown in FIG. 3 or its equivalent, which has a negatively sloped portion such as shown at 63 in FIG. 5. This constitutes a first spring means.

Figure 2:
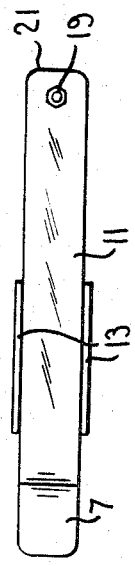
FIG. 2 is a plan view of a cantilever spring component, being viewed on line 2—2 of FIG. 1.

The term cantilever spring means one which is anchored at one end and movable at the other, and resilient between said ends, as shown in FIGS. 1, 2 and 4. This constitutes a second spring means. It should be understood that although the line 59 in FIG. 4 is straight, its straightness is not critical. It is important that the spring rate shall not change between positive and negative values (slopes).

The term differential thermal actuator means members having relatively high and low thermal coefficients of expansion, the members being connected to provide movements between parts thereof in response to temperature change. The rod-and-tube type of thermal actuator (1, 5 of FIG. 1) is particularly useful in that it may serve as a probe to be inserted in a heated space.

It is pointed out that differentially actuated rod-and-tube thermostatic elements such as 1 and 5 have comparatively limited relative movements under high force, which heretofore has made it impractical to combine such elements with switches which are snap-acting per se because of the small movement available and the wide temperature differential that resulted.

Heretofore, as shown in said Patent 2,793,270, a motion-multiplying arrangement has been used and this is retained in the present construction. Thus, referring to FIG. 1, the transverse motion effected on the cantilever spring member 11 at the connection between parts 13 and 15 is of a certain magnitude. Since this connection is closer to the hinge region 17 than the outer end 21 of the spring 11, the latter tends to move transversely at a greater rate, which is reflected in substantial degrees of flexing of the spring member 11 when such motion is resisted.

While the member 1 in FIG. 1 operates in tension and member 1 in FIG. 8 operates in compression for moving down the cantilever spring 11, the term rod is used to designate each, even though in the case in which it operates in tension (FIG. 1) it might be in the form of a wire. In fact, this "rod" may have other than a circular form as, for example, rectangular, channel-shaped, et cetera.

Circuitry to be used but now shown between the terminals 39, 55 and 57 is conventional and may vary to accomplish the desired ends. For example, a circuit may be used simply for signalling or, on the other hand, for controlling the temperature of the substance which heats the thermostatic elements 1, 5.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A thermostatic switch comprising first and second separate lengths of materials having different thermal coefficients of expansion and connected at one end of each, a cantilever spring, a support, the support and one end of the said spring being anchored to the other end of said first length of material, said cantilever spring being movable at its other end, said spring having a positive spring rate, a connection between the other end of the second length of material and the cantilever spring between the ends of the latter, a cantilever spring blade anchored at one of its ends to the support, the other end of the blade being movable and carrying a movable contact, said blade having a spring rate including a negative range, a pair of spaced stop means located to limit movements of the movable end of said blade, the spring rate in said negative range being greater than the positive spring rate of the cantilever spring, said stop means restricting movement of the movable end of the blade to that which occurs within said negative range, the spacing between said stop means determining the operating temperature differential of the switch, a compression link connecting the movable end of the cantilever spring and the blade in force opposition, and adjusting means for deforming a portion of the blade between its anchored and movable ends when its movable end is against one of said stops for changing the operating temperature of the switch.

2. A thermostatic switch according to claim 1 including a reinforcement in the cantilever spring to provide a substantially stiff portion therein between its ends, said connection between said second length of material and the cantilever spring being made at said stiff portion.

3. A thermostatic switch according to claim 2 wherein the connection between said first length of material and the cantilever spring is arranged on the side of the cantilever spring opposite to its side which is adjacent the spring blade.

4. A thermostatic switch according to claim 2 wherein the connection between said first length of material and the cantilever spring is arranged on the side of the cantilever spring adjacent the spring blade.

References Cited

UNITED STATES PATENTS 2,793,270  5/1957  Burch et al. _____ 200—137
3,239,633  3/1966  Bletz _____ 200—138

BERNARD A. GILHEANY, *Primary Examiner.*

H. A. LEWITTER, *Assistant Examiner.*

UNITED STATES PATENT OFFICE
CERTIFICATE OF CORRECTION

Patent No. 3,339,044                                    August 29, 1967

Raymond J. Ruckriegel et al.

It is hereby certified that error appears in the above numbered patent requiring correction and that the said Letters Patent should read as corrected below.

Column 2, line 18, for "Show-acting" read -- Slow-acting --; line 35, for "compression" read -- tension --.

Signed and sealed this 10th day of September 1968.

SEAL)

Attest:

Edward M. Fletcher, Jr.                                EDWARD J. BRENNER

Attesting Officer                                            Commissioner of Patents